United States Patent [19]

Shimizu

[11] Patent Number: 4,903,335
[45] Date of Patent: Feb. 20, 1990

[54] POWER-SAVING TYPE RECEIVER

[75] Inventor: Giichiro Shimizu, Tokyo, Japan

[73] Assignee: Man Design Co., Ltd., Tokyo, Japan

[21] Appl. No.: 298,044

[22] Filed: Jan. 18, 1989

[30] Foreign Application Priority Data

Jan. 25, 1988 [JP] Japan ................................ 63-14053
Dec. 29, 1988 [DE] Fed. Rep. of Germany ....... 3719869

[51] Int. Cl.$^4$ ............................................. H04B 1/16
[52] U.S. Cl. .................. 455/343; 340/825.44
[58] Field of Search ................ 455/127, 67, 343, 228, 455/226; 340/825.44, 825.47, 825.48

[56] References Cited

U.S. PATENT DOCUMENTS

| | | | |
|---|---|---|---|
| 4,481,675 | 11/1984 | Ichikawa et al. | 455/343 |
| 4,652,875 | 3/1987 | Waki | 340/825.44 |
| 4,663,623 | 5/1987 | Lax et al. | 455/343 |
| 4,691,382 | 9/1987 | Nakajima | 455/343 |
| 4,837,854 | 6/1989 | Oyagi et al. | 455/343 |

Primary Examiner—Robert L. Griffin
Assistant Examiner—Curtis A. Kunitz
Attorney, Agent, or Firm—Nixon & Vanderhye

[57] ABSTRACT

A receiver includes a signal-receiving section for receiving input signals and outputting detection signal, and a power source for supplying power thereto. A first detector detects a preamble of each input signal while a second detector detects the end of a postamble of each input signal. A power supply section supplies the power to the signal-receiving section by turning on a switch connected between the signal-receiving section and the power source when the first detector detects the preamble of the input signal. A periodic power-supply section turns on the switch periodically to supply the power periodically to the signal-receiving section when the second detector detects the end of the postamble of each input signal.

18 Claims, 5 Drawing Sheets

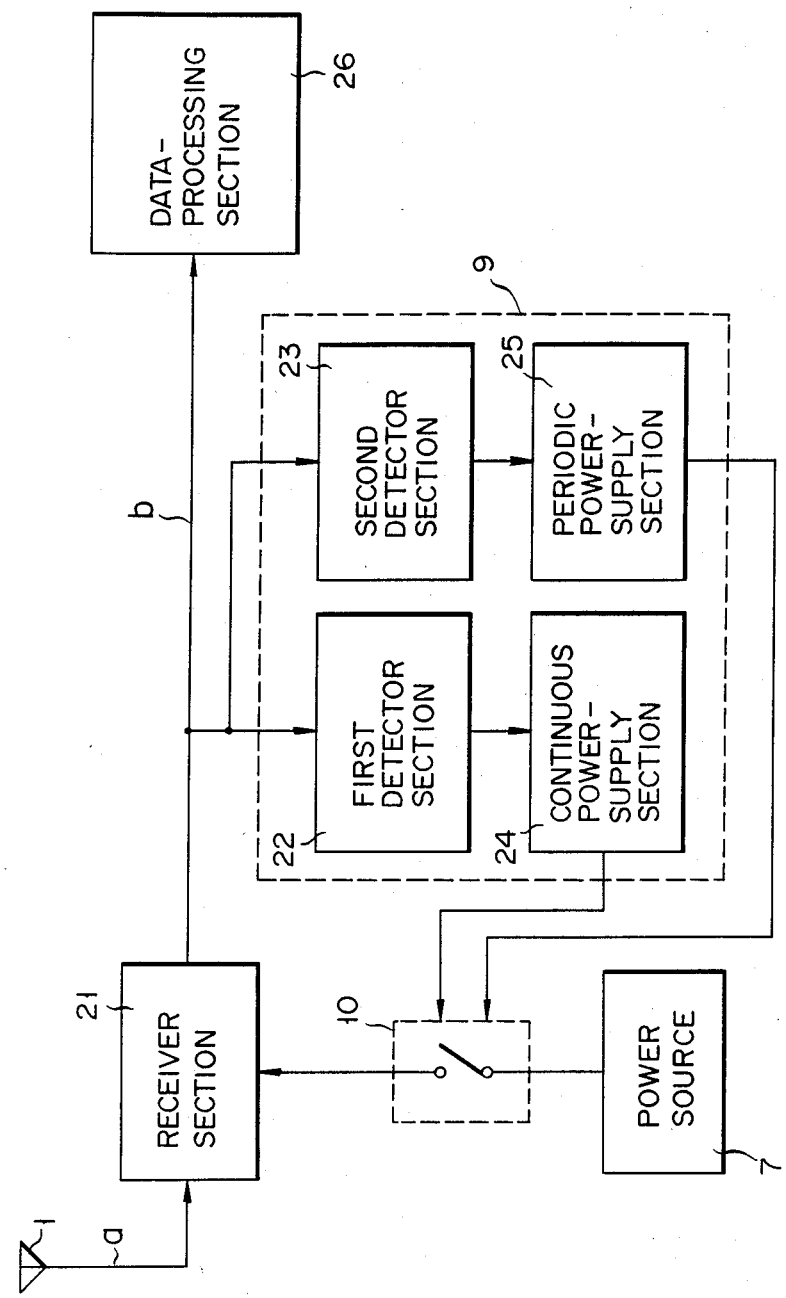
F I G. 1

POWER-SAVING TYPE RECEIVER

BACKGROUND OF THE INVENTION

1. Field of the Invention

The present invention relates to a receiver, and more particularly to a superheterodyne receiver designed to receive the radio signals output by a transmitter and representing digital data.

2. Description of the Related Art

A transmitter has been put to practically use, which can transmit radio signals representing digital data, over long distances. The radio signals have been generated in the following process. First, the digital data is converted into a serial frame consisting of bits; then, the frame is changed into radio signals, each at a high level corresponding to a "1" bit or a low level corresponding to a "0" bit. The radio signals are subjected to frequency-shift keying (FSK), and then transmitted from the transmitter. A receiver receives and converts the radio signals into the digital data.

The receiver comprises an antenna, a high-frequency amplifier, a local oscillator, a frequency conversion circuit, an IF (intermediate-frequency) amplifier, and detector circuit. The high-frequency amplifier amplifies the signals the antenna have received, and supplies these signals to the frequency conversion circuit. The local oscillator produces and supplies signals to the frequency conversion circuit. The frequency conversion circuit mixes the signals supplied from the high-frequency amplifier with those output by the local oscillator, thus generating IF signals. The IF amplifier amplifies the IF signals. The detector circuit detects and converts the amplified IF signals into digital data.

The receiver further comprises a display which displays data showing whether or not the receiver is receiving radio signals. Reading the this data, the operator knows whether or not the transmitter is receiving signals. The display must be driven even while no signals are being input to the receiver. Hence, it is necessary to supply power to the receiver from a power source such as a battery, no matter whether or not signals are being input to the receiver.

SUMMARY OF THE INVENTION

Accordingly, the object of the present invention is to provide a receiver to which power is periodically or intermittently supplied, thereby to save power.

According to the invention, there is provided a receiver for receiving input signals and outputting detection signals, each of the input signals including a preamble, a data portion, and a postamble, the receiver comprising:

signal-receiving means for receiving the input signals and outputting the detection signals;

power source means connected to the signal-receiving means, for supplying power thereto;

first detector means connected to the signal-receiving means, for detecting the preamble of each input signal;

second detector means connected to the signal-receiving means, for detecting the end of the postamble of each input signal;

switch means connected between the signal-receiving means and the power source means;

power-supply means connected to the switch means and the first detector means, for turning on the switch means for a predetermined time, thereby to supply the power to the signal-receiving means through the switch means, when the first detector means detects the preamble of the input signal, the predetermined time being proportional to the length of the data portion of each input signal; and periodic power-supply means connected to the switch means and the second detector means, for periodically turning on the switch means to supply the power periodically to the signal-receiving means when the second detector means detects the end of the postamble of each input signal.

BRIEF DESCRIPTION OF THE DRAWINGS

FIG. 1 is a block diagram showing a receiver according to the present invention;

DESCRIPTION OF THE PREFERRED EMBODIMENTS

Figure 2:
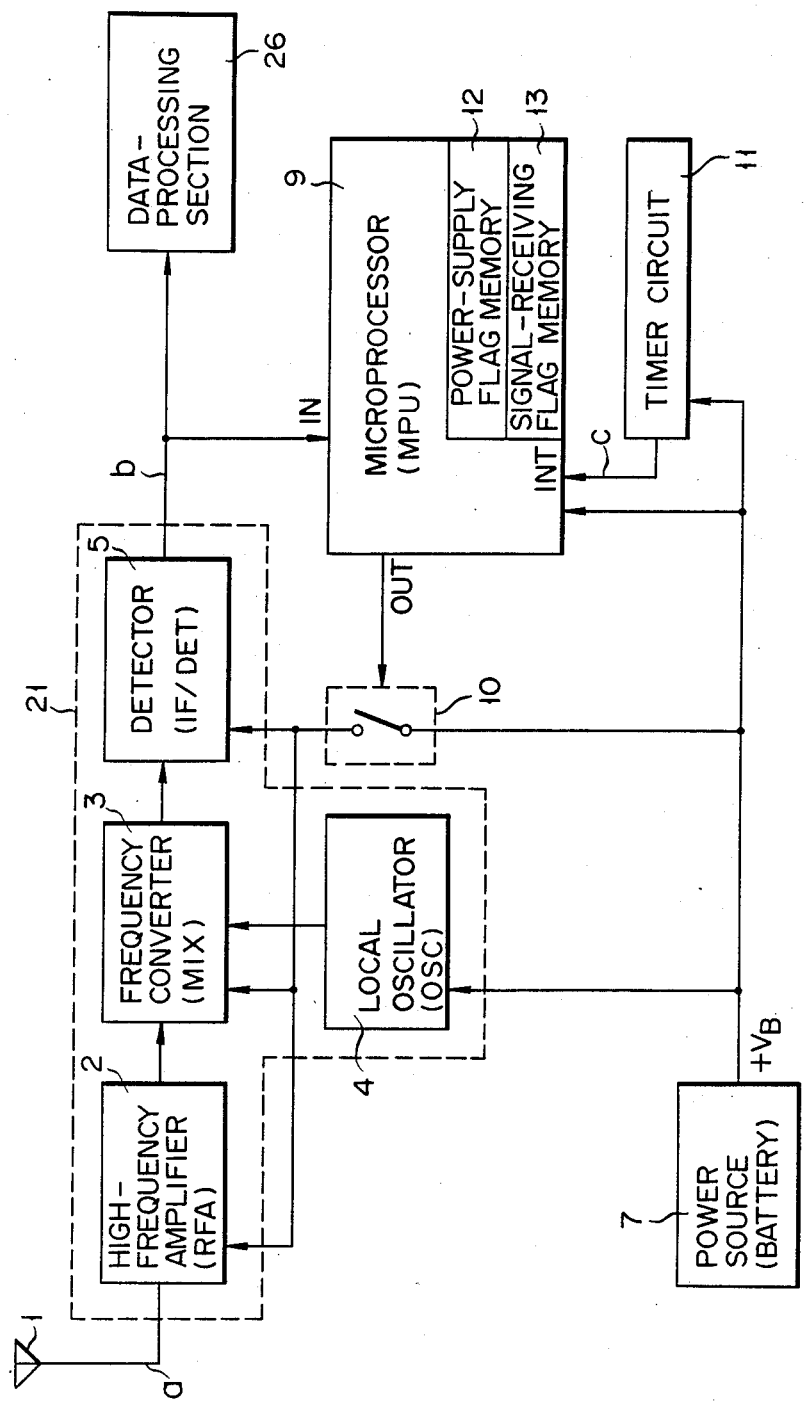
FIG. 2 is a detailed block diagram of the receiver shown in FIG. 1.

The superheterodyne receiver according to an embodiment of the invention will be now described with reference to FIG. 1.

Antenna 1 receives the signals a transmitted from a transmitter (not shown). Each signal a includes a preamble, a data portion, and a postamble. Receiver section 21 processes the input signal a into a data signal b (or a detection signal). The data signal b is supplied to data-processing section 26. Power is supplied from power source 7 via the switch circuit 10 to receiving section 21 when switch circuit 10 is closed. The data signal b is supplied to microprocessor 9 which comprises first detector section 22, second detector section 23, continuous power-supply section 24, and periodic power-supply section 25. More specifically, each data signal b is supplied to first detector section 22 and second detector section 23, both coupled to the receiver section 21. First detector section 22 detects the preamble of the signal b while second detector section 23 detects the postamble thereof. First detector section 22 and second detector section 23 are connected to continuous power-supply section 24 and periodic power-supply section 25, respectively. When first detector section 22 detects the preamble, continuous power-supply section 24 turns on switch circuit 10 for the period of time which is proportional to the length of the data portion of the signal b. When second detector section 23 detects the postamble, periodic power-supply section 25 periodically or intermittently turns on switch circuit 10.

As has been described above, while a data signal b is being supplied to microprocessor 9, switch circuit 10 is automatically turned on, thereby supplying power from power source 7 to receiver section 21, and while no data signals b are being supplied to microprocessor 9, switch circuit 10 is turned on and off repeatedly, thereby supplying power intermittently from power source 7 to receiver section 21. Therefore, the power for driving receiver circuit 21 can be saved.

The superheterodyne receiver according to the present invention will now be described with reference to FIG. 2.

Antenna 1 receives the radio signals a transmitted from a transmitter (not shown). Each radio signal a is supplied to receiver section 21 which comprises high-frequency amplifier 2, frequency converter 3, local oscillator 4, and detector 5. Amplifier 2 amplifies the radio signal a. Frequency converter 3 mixes the amplified signal a with the signal output by local oscillator 4, thereby generating an IF signal. The IF signal is supplied to an IF amplifier (not shown) incorporated in receiver section 21. The IF amplifier amplifies and supplies the IF signal to detector 5. Detector 5 detects and demodulates this signal into a data signal b which represents digital data and includes a transmission frame. The data signal b is at the level which is determined by the binary value, 0 or 1, of the digital data. The data signal b is supplied from receiver section 21 to data-processing section 26, and also to microprocessor 9.

According to the invention, microprocessor 9 can be incorporated into data-processing section 26.

Whenever necessary, a DC drive voltage $+V_B$ is applied from constant DC power source 7 (e g., a battery) to high-frequency amplifier 2, frequency converter 3, and detector 5 through analog switch 10 used as a switch circuit and turned on. The DC drive voltage $+V_B$ is applied, at all times, from constant DC power source 7 to local oscillator 4, microprocessor 9, and timer circuit 11.

Microprocessor 9 has input port IN for receiving data signals b, and output port OUT for supplying an on-off signal to analog switch 10. Timer circuit 11 inputs an interrupt request signal c to the interrupt terminal INT of microprocessor 9 every period of time $\Delta T$ (e.g., 10 ms). More precisely, timer circuit 11 contains a clock oscillator which supplies the interrupt request signals c to the interrupt terminal INT. Microprocessor 9 has memory 12 for storing a control program and a power-supply flag, and memory 13 for storing a signal-receiving flag.

Assume that analog switch 10 is turned on in accordance with the signal output by microprocessor 9, and that the drive voltage $+V_B$ is thereby applied from power source 7 to high-frequency amplifier 2, frequency converter 3, and detector 5. In this instance, amplifier 2, converter 3, and detector 5 are driven, whereby receiver section 21 converts the input signal a into a data signal b. The data signal b includes a transmission frame shown in FIG. 3. As is evident from this figure, the transmission frame includes a preamble which remains, for about 50 ms, at the high level corresponding to binary value 1, a data portion which consists of 1 bits and 0 bits, and a postamble which remains, for about 50 ms, at the low level corresponding to binary value 0.

Figure 4A:
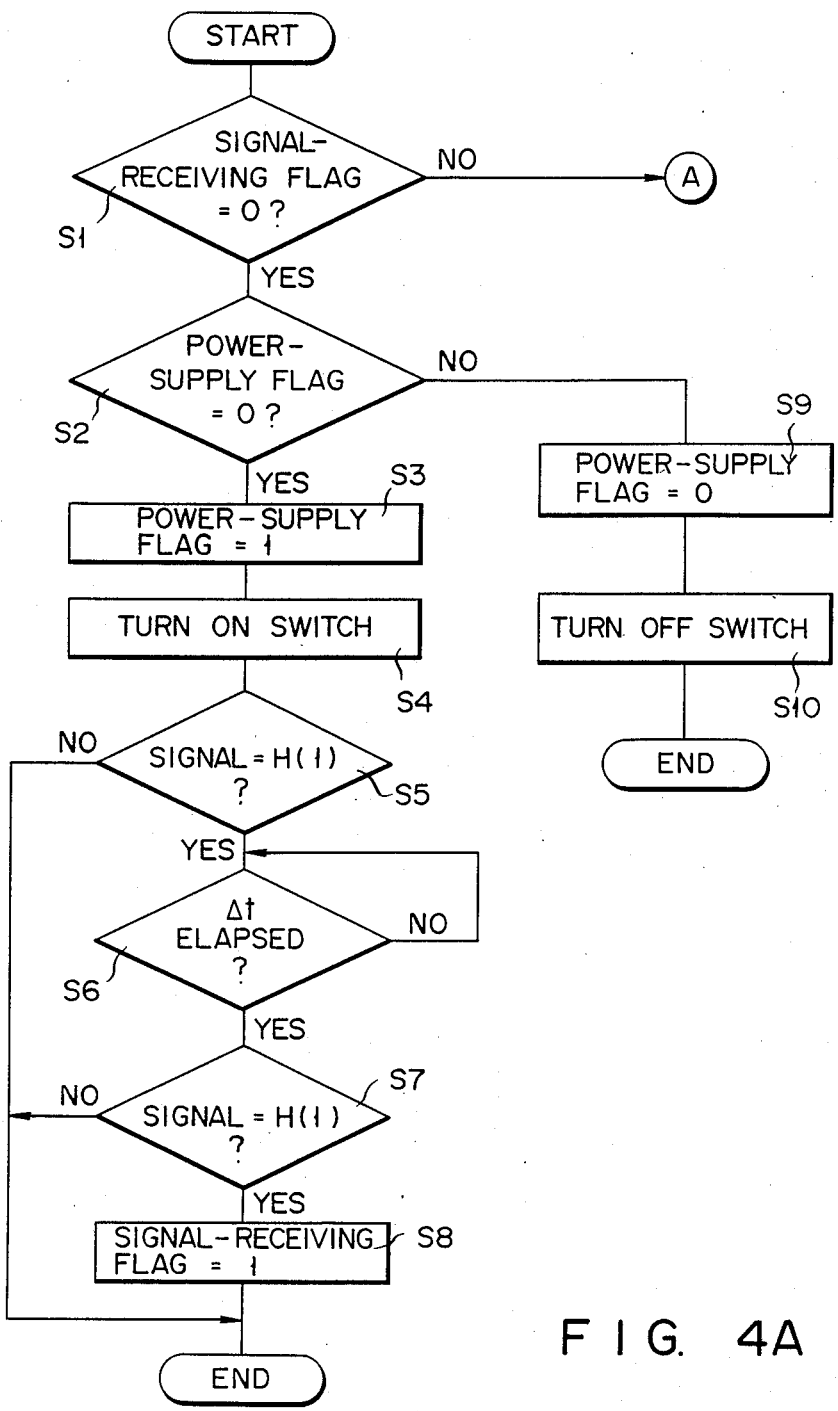
FIGS. 4A and 4B are a flow chart illustrating the operation of the receiver shown in FIG. 2.
Figure 4B:
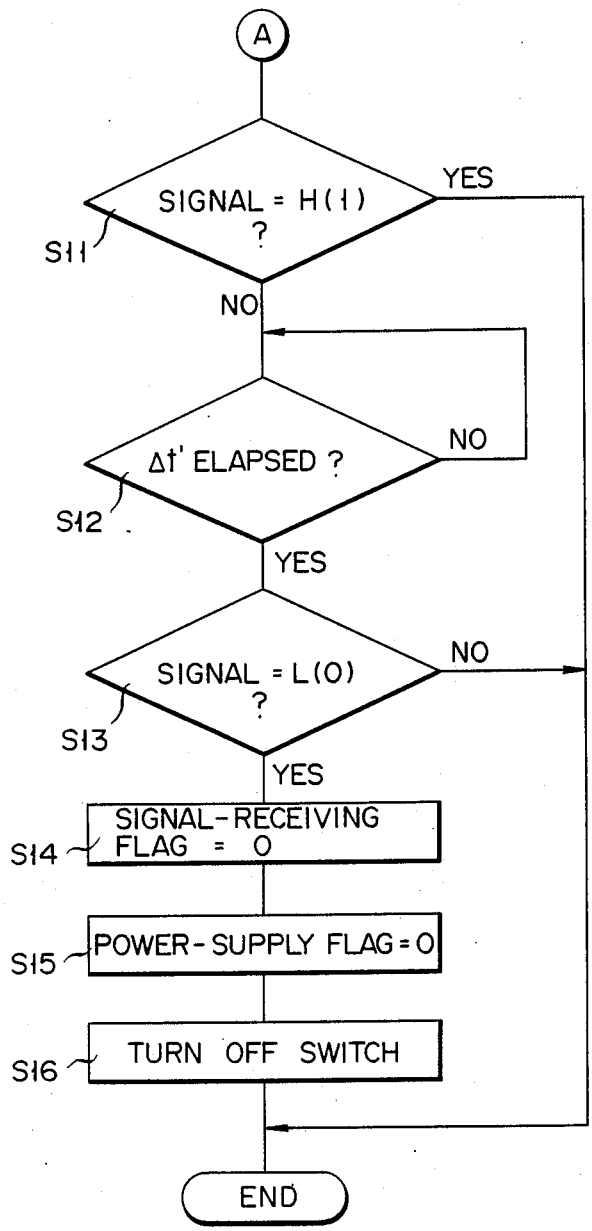

Every time microprocessor 9 receives the interrupt request signal c, it performs the operation represented by the flow chart of FIGS. 4A and 4B. More specifically, microprocessor 9 executes interruption every period of time $\Delta T$ (e.g., 10 ms). In step S1, it is determined whether or not the signal-receiving flag stored in memory 13 is 0. If YES, it is ascertained that no signal b are being supplied to receiver section 21, and the operation goes to step S2. In this step, it is determined whether or not the power-supply flag stored in memory 12 is 0. If YES, it means that analog switch 10 is turned off, and that the drive voltage $+V_B$ is not applied to amplifier 2, converter 3, or detector 5. Then, in step S3, the power-supply flag is set to 1, whereby microprocessor 9 supplies an on-signal from its output port OUT to analog switch 10. Hence, in step S4, analog switch 10 is turned on. As a result of this, the drive voltage $+V_B$ is applied from power source 7 to amplifier 2, converter 3, and detector 5. Detector 5 demodulates the input signal a into a data signal b, which is supplied to microprocessor 9 and data-processing section 26.

In step S5, it is determined whether or not the signal b supplied to the input port IN of microprocessor 9 is at the high level corresponding to binary value 1. If YES in step S5, the operation goes to step S6, in which it is determined whether a predetermined time $\Delta t$ (e.g., 1 to 10 ms) has elapsed or not. If NO, step S6 i repeated until the period $\Delta t$ expires. If YES, the interrupt operation goes to the next step, S7. In step S7, it is determined again whether or not the signal b supplied to the input port IN is at the high level. If YES, that is, if the signal b is still at the high level, it means that the preamble (FIG. 3) of the signal b has been detected. In this instance, the signal-receiving flag stored in memory 13 is set to 1.

The predetermined time $\Delta t$ is substantially shorter than the period $\Delta T$ upon lapse of which timer circuit 11 outputs an interrupt request signal c, and is tens of times longer than the duration of each one bit of the data portion. Hence, microprocessor 9 can distinguish the time $\Delta t$ from $\Delta T$ and also from the the duration of one bit. Hence, whenever steps S5, S6, and S7 are carried out, microprocessor 9 can determine that the preamble is at the high level.

If NO in step S7, that is, if the signal b is not at the high level, it is determined that the signal b has temporarily been at the high level. If NO in step S5, that is, if the signal b is not at the high level, it is determined that the data signal b contains no transmission frames. In either case, microprocessor 9 completes the interrupt operation. Thereafter, upon lapse of the period $\Delta T$, microprocessor 9 performs the interrupt operation for the second time. Since step S8 has not been executed in the first interrupt operation, microprocessor 9 determines in step S1 that the signal-receiving flag is 0. Hence, the interrupt operation goes to step S2. Since the power-supply flag has been set 1 in step S3 of the first interrupt operation, it is NO in step S2. In this case, the operation goes to step S9, in which the power-supply flag is set to 0. Then, in step S10, analog switch 10 is turned off. Thus, analog switch 10 is turned off every time the period $\Delta T$ expires as long as no transmission frames are supplied to receiver section 21.

If NO in step S1, that is, if the signal receiving flag is set to 1, analog switch 10 remains turned on, the operation goes to step S11, in which microprocessor 9 determines whether or not the data signal b is at the high level. If YES, this means that the transmission frame is still being supplied to receiver section 21. Hence, microprocessor 9 completes the interrupt operation. On the other hand, if NO in step S11, that is, if the data signal b is at the low level, microprocessor 9 determines, in step S12, whether or not a predetermined time $\Delta t'$ (e.g., 1 to 10 ms) has elapsed. If YES, it is determined in step S13 whether or not the data signal b has remained at the low level during this period $\Delta t'$. If YES in step S13, this means that the end of the postamble, i.e., the end of the transmission frame (FIG. 3), has been detected. The time $\Delta t'$ corresponds to a number of bits a little greater than the maximum number of consecutive 0 bits included in the data portion of the transmission frame.

When the end of the transmission frame is detected in step S13, the signal-receiving flag stored in memory 13 is set to 0 in step S13, the power-supply flag stored in memory 12 is also set to 0 in step S14, and analog switch 10 is turned off in step S16. Thus supply of the drive voltage $+V_B$ to amplifier 2, converter 3, and detector 5 is therefore stopped.

If YES in step S11, that is, the signal b is at the high level, or if NO in step S13, that is, if the data signal b has not remained at the low level during this period $\Delta t'$, this means that the transmission frame has not been completely received by receiver section 21. In either case, microprocessor 9 stops performing the interrupt operation. If NO in step S12, that is, if the period $\Delta t'$ has not been elapsed, step S12 is repeated until this period expires.

Figure 3:
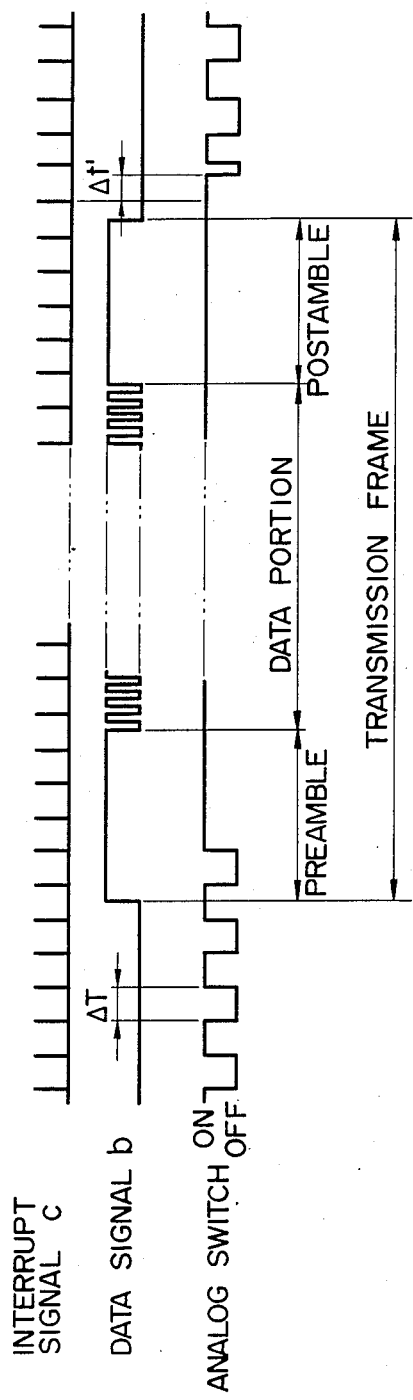
FIG. 3 is a timing chart explaining how the receiver shown in FIG. 2 operates.

As can be understood from FIG. 3, analog switch 10 is periodically or intermittently turned on at intervals of $\Delta T$, as long as receiver section 21 receives no transmission frames. Therefore, the drive voltage $+V_B$ is periodically applied to amplifier 2, converter 3, and detector 5. Every time it is detected, while analog switch 10 is on, that the data signal b has remained at the high level for period $\Delta t$ or longer, it is determined that receiver section 21 starts receiving a transmission frame, and analog switch 10 is held closed. When the data signal b remains at the low level for the period $\Delta t'$ after section 21 has received the entire transmission frame, it is detected that the transmission frame has been received in its entirety. Then, analog switch 10 is turned off, whereby the supply of the voltage $+V_B$ to amplifier 2, converter 3, and detector 5 is stopped.

As has been described, power is supplied to high-frequency amplifier 2, frequency converter 3, and detector 5 while receiver section 21 is receiving a transmission frame. While section 21 is receiving no transmission frames, power is periodically supplied to amplifier 2, converter 3, and detector 5, at intervals of $\Delta T$. Since amplifier 2 consumes much more power than microprocessor 9, timer circuit 11 and local oscillator 4 which are also driven by the voltage $+V_B$, power can be saved very much. As a result, the battery incorporated in power source last much longer than in the case where power is supplied to amplifier 2, converter 3, and detector 5 even while section 21 is receiving no transmission frames. Hence, the receiver according to the invention can be small and light.

The present invention is not limited to the embodiments described above. Further, it need not be limited to receivers; it can apply to any other signal-processing apparatus. In the embodiment shown in FIG. 2, analog switch 10 is connected between power source 7, on the one hand, and amplifier 2, converter 3, and detector 5, on the other hand, and the drive voltage $V_B$ is applied from power source 7 to local oscillator 4 at all times so that oscillator 4 outputs signals which are stable in frequency. Instead, analog switch can be connected between power source 7 and oscillator 4, so that the power is supplied to oscillator 4 at intervals of $\Delta T$. In this case, power will be saved much more.

What is claimed is:

1. A receiver for receiving input signals and outputting detection signals, each of said input signals including a preamble, a data portion, and a postamble, said receiver comprising:

signal-receiving means for receiving the input signals and outputting the detection signals;

power source means connected to the signal-receiving means, for supplying power thereto;

first detector means connected to the signal-receiving means, for detecting the preamble of each input signal;

second detector means connected to the signal-receiving means, for detecting the end of the postamble of each input signal;

switch means connected between the signal-receiving means and the power source means;

power-supply means connected to the switch means and the first detector means, for turning on said switch means for a predetermined time, thereby to supply the power to the signal-receiving means through the switch means, when said first detector means detects the preamble of the input signal, said predetermined time being proportional to the length of the data portion of each input signal; and periodic power-supply means connected to the switch means and the second detector means, for periodically turning on the switch means to supply the power periodically to the signal-receiving means when said second detector means detects the end of the postamble of each input signal.

2. The receiver according to claim 1, further comprising clock-generating means for generating clock signals at predetermined time intervals, and wherein said periodic power-supply means periodically turns on said switch means at said intervals.

3. The receiver according to claim 2, wherein said time intervals are 10 ms.

4. The receiver according to claim 1, wherein the first detector means detects the preamble of each input signal by detecting that the input signal remains at a high level for a predetermined period of time.

5. The receiver according to claim 1, wherein said period of time intervals is 1 to 10 ms.

6. The receiver according to claim 1, wherein said second detector means detects the end of postamble of each input signal by detecting that the input signal remains at a low level for a predetermined period of time.

7. The receiver according to claim 6, wherein said time is 1 to 10 ms.

8. The receiver according to claim 1, wherein said power source means includes a battery.

9. The receiver according to claim 1, wherein said signal-receiving means comprises a high-frequency amplifier for amplifying each input signal, a frequency converter for converting the frequency of the input signal, and a detector for detecting the input signal whose frequency has been converted by said frequency converter.

10. A receiver for receiving input signals and outputting processed signals, each of said input signals including a preamble, a data portion, and a postamble, said receiver comprising:

signal-receiving means for receiving the input signals and outputting the processed signals;

power source means connected to the signal-receiving means, for supplying power thereto;

first detector means connected to the signal-receiving means, for detecting the preamble of each input signal;

second detector means connected to the signal-receiving means, for detecting the end of the postamble of each input signal;

switch means connected between the signal-receiving means and the power source means;

power-supply means connected to the switch means and the first detector means, for turning on said switch means for a predetermined time, thereby to supply the power to the signal-receiving means through the switch means, when said first detector means detects the preamble of the input signal, said predetermined time being proportional to the length of the data portion of each input signal; and periodic power-supply means connected to the switch means and the second detector means, for periodically turning on the switch means to supply the power periodically to the signal-receiving means when said second detector means detects the end of the postamble of each input signal.

11. The receiver according to claim 10, further comprising clock-generating means for generating clock signals at predetermined time intervals, and wherein said periodic power-supply means periodically turns on said switch means at said intervals.

12. The receiver according to claim 11, wherein said time intervals are 10 ms.

13. The receiver according to claim 10, wherein the first detector means detects the preamble of each input signal by detecting that the input signal remains at a high level for a predetermined period of time.

14. The receiver according to claim 13, wherein said period of time intervals is 1 to 10 ms.

15. The receiver according to claim 10, wherein said second detector means detects the end of postamble of each input signal by detecting that the input signal remains at a low level for a predetermined period of time.

16. The receiver according to claim 15, wherein said time is 1 to 10 ms.

17. The receiver according to claim 10, wherein said power source means includes a battery.

18. The receiver according to claim 10, wherein said signal-receiving means comprises a high-frequency amplifier for amplifying each input signal, a frequency converter for converting the frequency of the input signal, and a detector for detecting the input signal whose frequency has been converted by said frequency converter.

* * * * *

UNITED STATES PATENT AND TRADEMARK OFFICE
CERTIFICATE OF CORRECTION

PATENT NO. : 4,903,335

DATED : February 20, 1990

INVENTOR(S) : Giichiro SHIMIZU

It is certified that error appears in the above-identified patent and that said Letters Patent is hereby corrected as shown below:

In the Heading at section [30] regarding Foreign Application Priority Data, delete in its entirety:

"Dec. 29, 1988 [DE] Fed. Rep. of Germany.....3719869"

Signed and Sealed this

Thirtieth Day of July, 1991

Attest:

HARRY F. MANBECK, JR.

Attesting Officer

Commissioner of Patents and Trademarks